United States Patent [19]
>
> ## Heisler

[11] Patent Number: 4,983,098
[45] Date of Patent: Jan. 8, 1991

[54] SEPARATING AND FEEDING A PREFORMED CONTAINER FROM A NESTED STACK

[76] Inventor: Raymond A. Heisler, 657 Dakota Trail, Franklin Lakes, N.J. 07417

[21] Appl. No.: 463,121

[22] Filed: Jan. 10, 1990

[51] Int. Cl.⁵ .............................................. B65G 59/10
[52] U.S. Cl. ............................ 414/798.9; 414/796.4; 414/795.8; 414/757; 414/768; 414/769; 414/770; 221/172; 198/822; 198/604; 198/607
[58] Field of Search ............. 414/796.4, 798.9, 795.6, 414/795.8, 757, 768–770, 784; 198/822, 836, 600, 604, 607, 407, 408, 376; 221/261, 293, 298

[56] References Cited

U.S. PATENT DOCUMENTS

| | | | |
|---|---|---|---|
| 3,120,888 | 2/1964 | Piel | 221/156 X |
| 3,160,260 | 12/1964 | Holland | 414/796.4 X |
| 3,391,827 | 7/1968 | Govatsos | 221/172 |
| 3,521,763 | 7/1970 | Heide et al. | 414/797.2 X |
| 4,037,734 | 7/1977 | Erdman | 414/795.8 X |
| 4,054,212 | 10/1977 | Mueller | 414/798.9 X |
| 4,120,392 | 10/1978 | Sturm | 198/600 X |
| 4,710,089 | 12/1987 | Schneider | 414/795.8 X |

Primary Examiner—Frank E. Werner
Assistant Examiner—Brian K. Dinicola
Attorney, Agent, or Firm—Patrick J. Pinto

[57] ABSTRACT

An improved apparatus for separating and feeding a preformed container from a nested stack, said apparatus adapted for accepting a nested stack of containers in a vertical array, tilting the nested stack to a horizontal array by means of a tilting carriage assembly (34), advancing the horizontal stack (170) on an advancing portion (36), stopping the nested stack at a preferred position and immediately lifting the nested stack from the advancing portion (36) by means of an elongated rail assembly 96. A separating assembly (38) separates a first container from the nested stack, said first container advances to a pivoting hook assembly (40) where the first container is oriented from a substantially horizontal array to a substantially vertical array, and a stabilizer assembly (42) steadies the horizontal container for transfer to subsequent machinery.

18 Claims, 8 Drawing Sheets

FIG. 13

SEPARATING AND FEEDING A PREFORMED CONTAINER FROM A NESTED STACK

BACKGROUND OF THE INVENTION

1. Field of the Invention

With respect to the art, as established in and by the United States Patent and Trademark Office, this invention is believed to be found in the general class entitled "Article Handling" and more particularly "separating and reorienting a preformed container".

2. Description of the Prior Art

As far as it is known, apparatus for separating a preformed container from a nested stack are known. Some examples of prior art are U.S. Pat. No. 4,054,212 as issued to Mueller on Oct. 18, 1977; U.S. Pat. No. 3,120,888 as issued to Piel on Feb. 11, 1964, and U.S. Pat. No. 3,160,260 as issued to Holland on Dec. 8, 1964. In U.S. Pat. No. 4,054,212, Mueller discloses an apparatus for separating preformed cups from a nested stack then placing said cup in a holder of a conveyor. U.S. Pat. No. 3,120,888, as issued to Piel, discloses a vibratory feeder for reorienting a preformed container. Holland, in U.S. Pat. No. 3,160,260, discloses an apparatus for handling stacked containers. These known prior art devices do not satisfy the present need for an apparatus for separating a preformed container from a nested stack and metering each separated container in a preferred orientation for subsequent filling and capping operations. This needed apparatus should be capable of accommodating various types of containers in a range of sizes.

SUMMARY OF THE INVENTION

This invention may be summarized, at least in part, with respect to its objects. It is object of this invention to provide and it does provide an apparatus which will accept vertically nested stacks of preformed containers directly from a delivery pallet substantially at floor level.

It is another object of this invention to provide and it does provide an apparatus for accepting a vertical nested stack of preformed containers and subsequently tilting said nested stack for advancement on a pair of endless belts to a separating station.

It is a further object of this invention to provide and it does provide an apparatus for separating a container from a intermittently advancing nested stack of preformed containers. This nested stack advances, in horizontal array, of a pair of endless belts. A separating means also engages a pivoting handle and positions said handle in a preferred alignment.

It is a still further object of this invention to provide and it does provide an apparatus for tilting an advancing separated container from a substantially horizontal array to a substantially vertical array.

It is still another object of this invention to provide and it does provide an apparatus adaptable for separating a range of container sizes with a minimum of change parts or adjustments.

In addition to the above summary, the following disclosure is detailed to insure adequacy and aid in the understanding of this invention. This disclosure, however, is not intended to cover each new and inventive concept, no matter how it may later be disguised by variations in form or additions by further improvements. For this reason, there has been chosen specific embodiments of an apparatus for separating and feeding of preformed container from a nested stack. This apparatus is particularly adapted for use with commercially available material handling equipment and/or container filling and covering equipment. These specific embodiments have been chosen for the purpose of illustration and description, as shown in the accompanying drawing wherein:

In the following description and in the claims, various details are identified by specific names for convenience. These names are intended to be generic in their application. The corresponding reference characters refer to like members throughout the several figures of the drawings.

The drawings accompanying and forming a part of this specification disclose certain details of construction associated with placing a nested stack of preformed containers on a tilting carriage assembly, subsequently advancing said stack to a separating assembly, a first of the containers separated from the nested stack is then tilted or oriented for subsequent filling operations. These details are for the purpose of explanation, but structural details may be modified without departure from the concept and principles of the present invention. It is anticipated that this invention may be incorporated into forms other than as shown.

Figure 1:
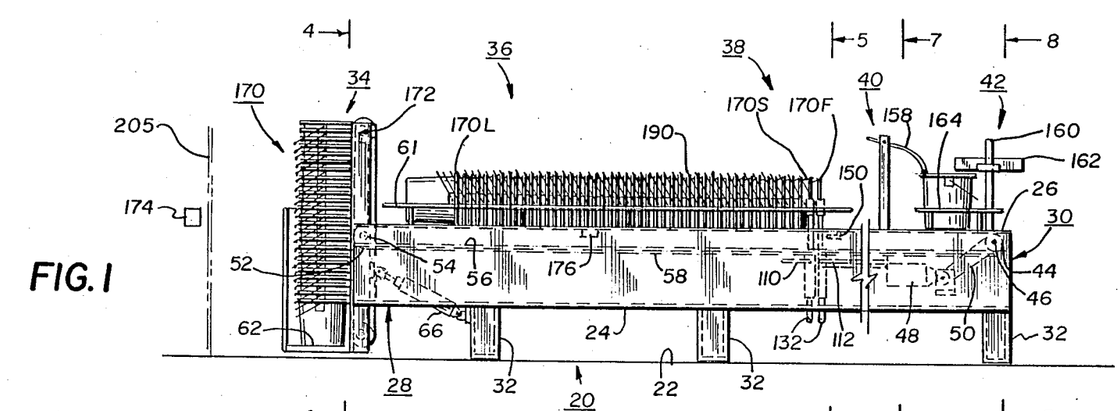
FIG. 1 represents a front elevation view, partly diagrammatic, of an apparatus for separating and feeding a preformed container from a nested stack, this view particularly showing a tilting carriage assembly in a vertical array.
Figure 3:
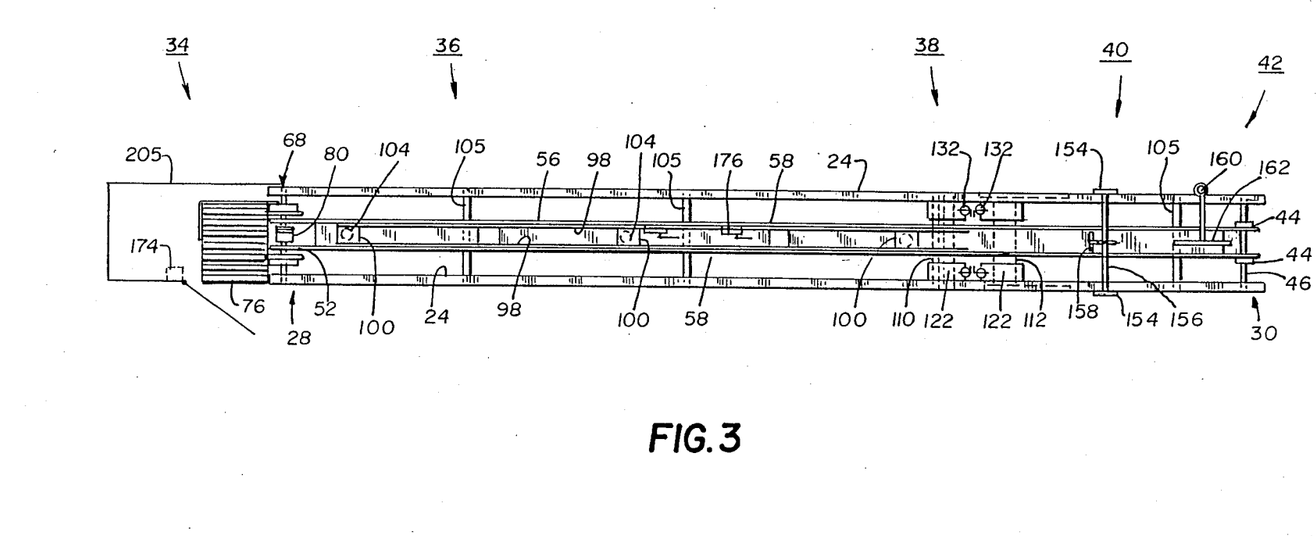
FIG. 3 represents a plan view of the apparatus of FIG. 1, this view in a slightly enlarged scale.

EMBODIMENT OF FIG. 1 AND FIG. 3

Referring to FIG. 1, the apparatus of the present invention is shown as having an elongated base assembly, generally identified as 20. This base assembly 20 is adapted for resting on a floor 22 of a process or manufacturing plant. The preferred base assembly 20 includes a pair of elongated formed side frames 24. These side frames 24 are preferably formed in a more or less channel shape. Each of the side frames 24 having an upper edge portion 26, an infeed end 28, and an discharge end 30. The side frames 24 are held in spaced alignment by a multiplicity of spacer members, not identified. Each of the side frames 24 are shown being carried by leg members 32.

A tilting carriage assembly, generally identified as 34, is shown as being pivotably mounted at or near the infeed end 28 of the base assembly 20. A nested stack advancing portion, generally identified as 36, is located downstream of said tilting carriage assembly 34. A separating assembly, generally identified as 38, is located immediately adjacent the nested stack advancing portion 36. A pivoting hook assembly, generally identified as 40, is mounted on the base assembly 20 at a selected distance downstream from the separating assembly 38. A stabilizer assembly 42 is mounted at or near the discharge end 30 of the base assembly 20.

Referring to FIG. 1 and FIG. 3, a pair of drive pulleys 44 are mounted in a selected spaced relationship on a drive shaft 46. Drive shaft 46 is mounted interior of side frames 24 and journaled therein and thereon. A drive means 48 such as a commercially available electric motor/reducer, is connected to the drive shaft 46 by a suitable transmission means 50, such as a standard roller chain and sprocket arrangement. A pair of driven pulleys 52 are journaled in spaced relationship on a stationary shaft 54. This stationary shaft 54 is mounted interior of the side frames 24 at the infeed end 28.

Referring to FIG. 3 an elongated trough member 56 is centrally mounted interior of the side frames 24. The trough member 56 extends from the infeed end 28 to the discharge end 30. A pair of endless long belts 58 are carried on the drive pulley 44 and the driven pulley 52. A top strand 60 of the long belt 58 is supported and guided in alignment with drive pulleys 44 and driven pulleys 52 by the trough member 56. This guiding and supporting arrangement may be more clearly seen in FIG. 5. Each of the top strands 60 of the long belts 58 are selectively spaced in a more or less parallel alignment. This preferred spacing will support a range of diameters for preformed containers. The nested stack advancing portion 36 preferably includes a pair of guiding rails 61. These guiding rails 61 are adjustably mounted to each of the side frames 24. Preferably these guiding rails 61 positioned to prevent the nested stack from deviating from a preferred path of advancement on and with the long belts 58. These guiding rails 61, when properly positioned will also control any rotation of the nested stack within acceptable limits.

The long belts 58 have been shown as having a round cross section. This round cross section is a matter of design preference and other suitable cross sections may be used. The long belts are anticipated to be of polyurethane material and commercially available. This type of belt is easily cut to length and welded in place to provide a substantially endless construction.

Figure 4:
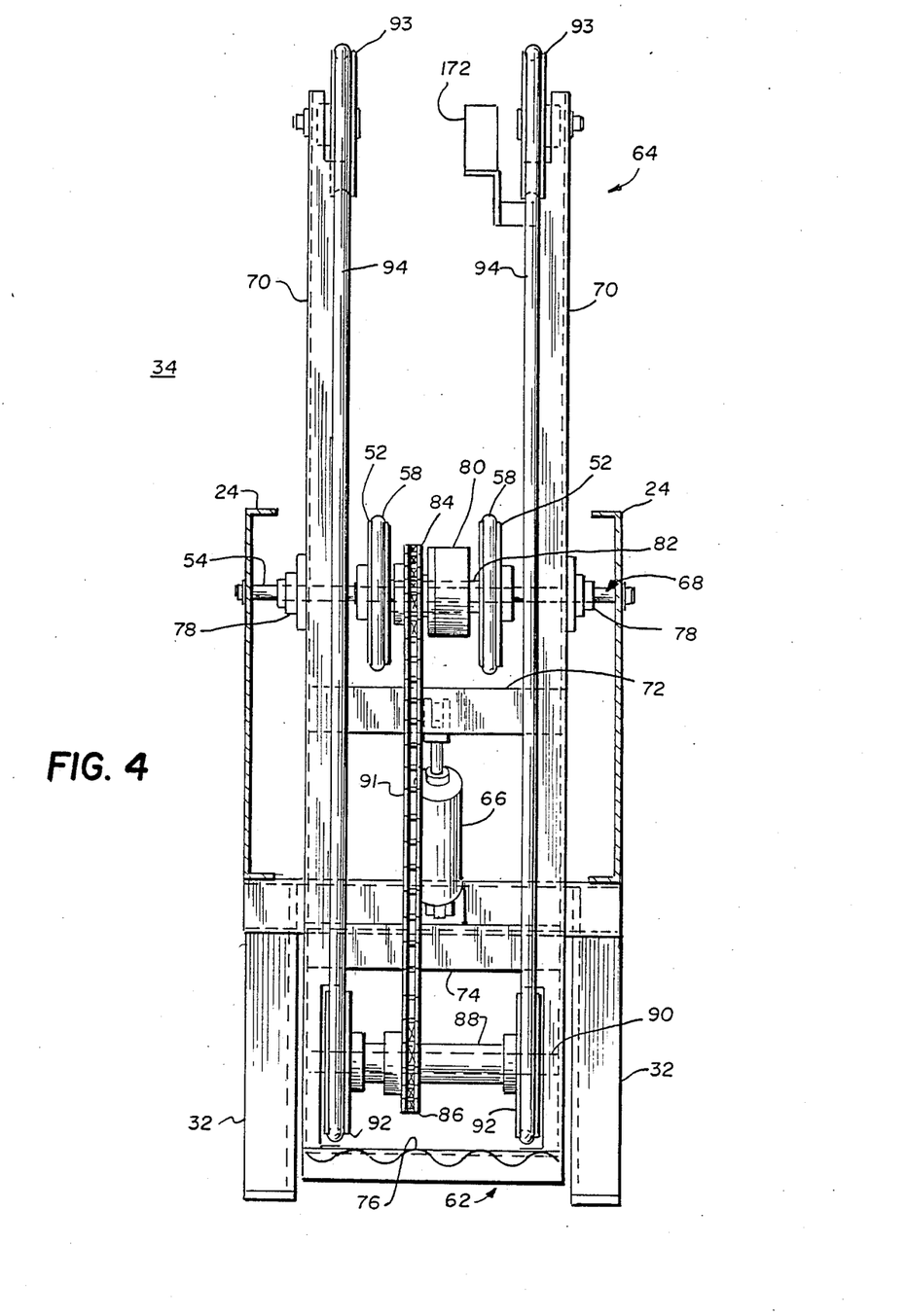
FIG. 4 represents an end elevation view of the apparatus of FIG. 1, in an enlarged scale; this view showing a first embodiment of a tilting carriage assembly for accepting a nested stack of containers in a vertical array, and taken along line 4—4 of FIG. 1.

EMBODIMENT OF FIG. 4

Referring to FIG. 4, there is shown a first arrangement for a tilting carriage or conveyor assembly 34. This tilting conveyor assembly 34 includes a support end 62, an extending end 64, a linear actuator 66, and a pivot means 68.

A pair of elongated rail members 70 are held in a selectively spaced relationship exterior of the driven pulleys 52 by a first cross member 72, a second cross member 74, and a support shelf portion 76. Each of the rail members 70 are journaled on the stationary shaft 54 by a suitable means such as flanged bearings 78. An intermittently controlled drive means 80 is mounted between driven pulleys 52. It is anticipated that this drive means 80 may be a commercially available clutch, which is electrically or pneumatically operated. Each of the driven pulleys 52 and the drive means 80 are carried and engaged on a common sleeve member 82. This sleeve member 82 is journaled on stationary shaft 54. A first sprocket 84 is mounted on an output portion of the drive means 80. A second sprocket 86 is mounted on a second sleeve member 88. This sleeve member 88 is journaled on a round stationary bar 90. This stationary bar 90 is fastened to and between rails 70 at the support end 62. A roller chain 91 is employed to drive the second sprocket 86 as and when the first sprocket 84 is driven by the drive means 80.

A pair of second drive pulleys 92 are engaged on the second sleeve member 88. A pair of second driven pulleys 93 are rotatably mounted on the extended end 64 of each rail member 70. Each of these second driven pulley 93 is cantilevered from each rail member 70 substantially as shown. A short endless belt 94 is carried on each second drive pulley 92 and second driven pulley 93. This short belt 94 preferably is of the same type and construction as the long belt 58.

Figure 5:
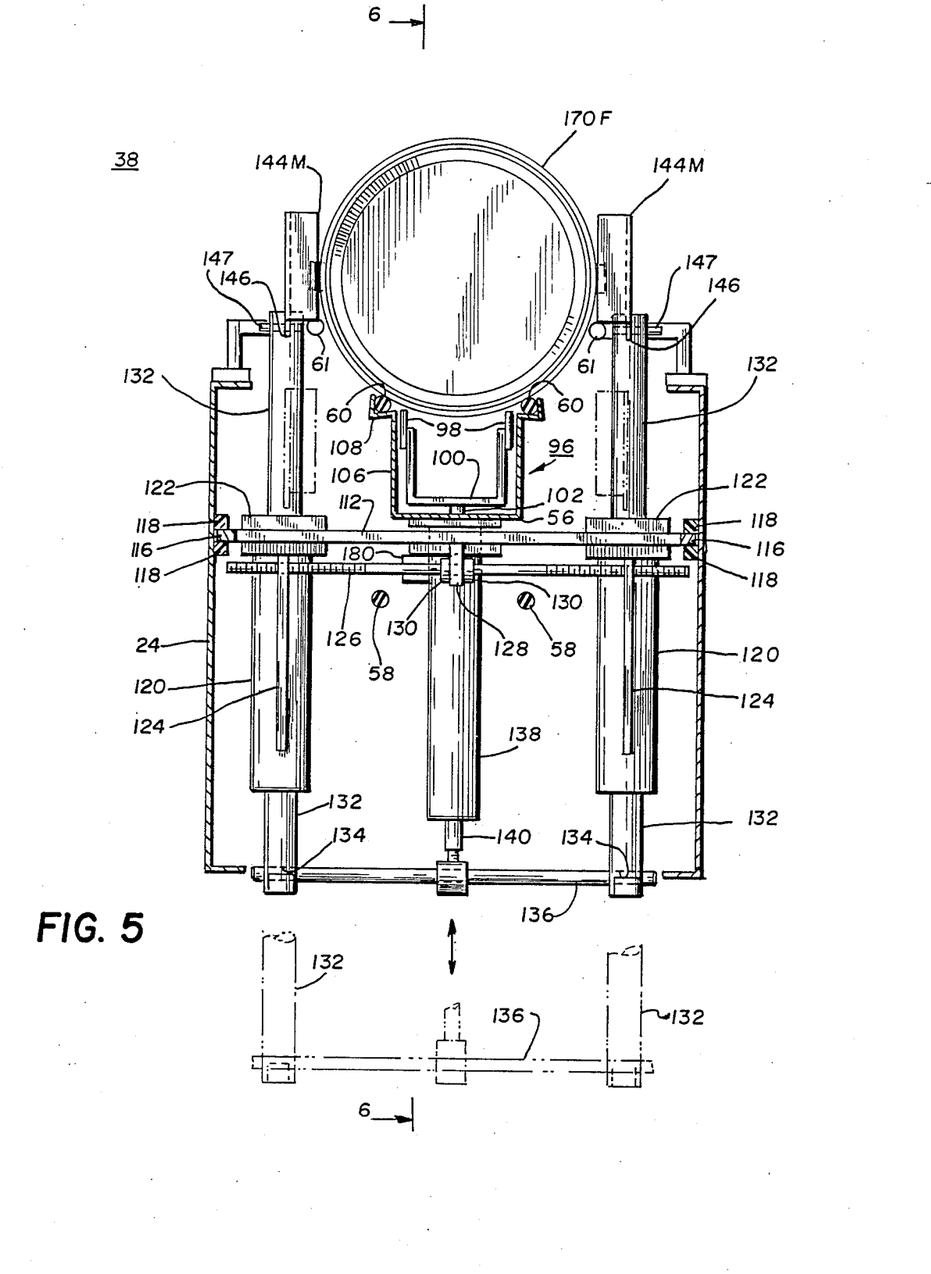
FIG. 5 represents a fragmentary section view of the separating assembly, this view, in enlarged scale and taken along line 5—5 of FIG. 1.
Figure 6:
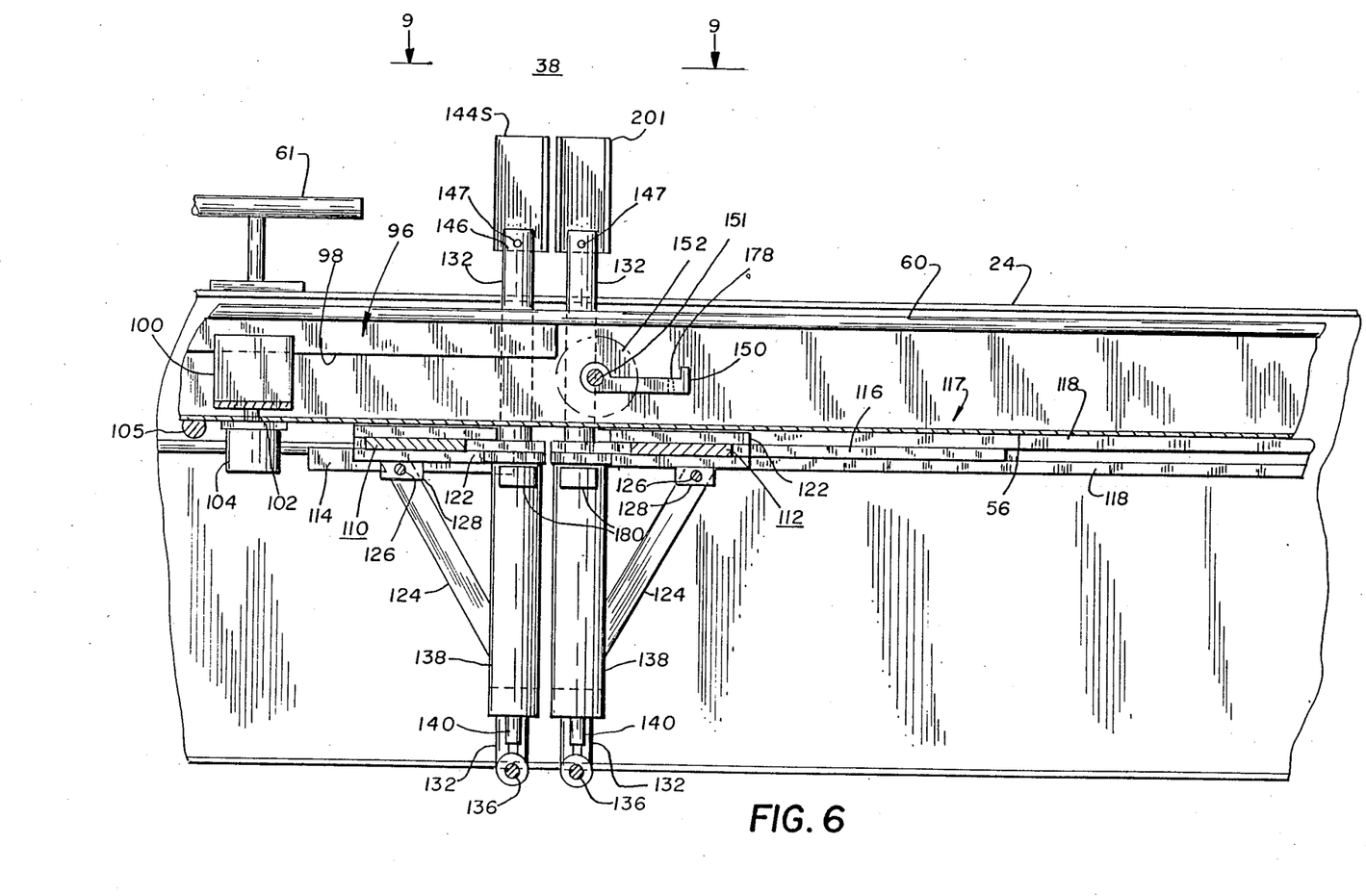
FIG. 6 represents a fragmentary section view, partly diagrammatic, of the separating assembly and this view taken along line 6—6 of FIG. 5.

EMBODIMENT OF FIG. 5 AND FIG. 6

Referring to FIG. 6, an elongated rail assembly generally identified as 96 includes a pair of elongated rails 98 secured to a plurality of U-shaped bracket members 100. Each bracket member 100 is mounted to a shaft 102 of a short stroke linear actuator 104. Each of the linear actuators 104 is mounted to the bottom side of trough member 56. The quantity and position of these linear actuators 104 is a matter of design selection.

The trough member 56 is mounted to a plurality of crossbar members 105. Each of the crossbar members 105 is mounted to and interior of the base assembly 20. The trough member 56 guides the top strand 60 of each of the long belts 58 in a desired position relative to the upper edge portion 26 of the side frame members 24, as may be seen in FIG. 5. Each extending leg 106 of the trough member 56 is formed to provide V-shaped channel 108. It has been found that a V-shaped channel with an included angle of approximately eighty degrees will provide the desired guidance and support for a ½ inch diameter belt. This V-shaped channel 108 simultaneously guides and supports the top strand 60 of the long belts 58 in a desired spaced array.

Referring again to FIG. 6, a separating assembly 38 is shown to the right of the end of the elongated rail assembly 96. The separating assembly 38 has a stationary support 110 and a movable support 112. The stationary support 110 is secured to each of the side frames 24 by attachment bars 114. An elongated slide bar 116 is attached to each end of the movable support 112. These slide bars 116 are carried in guide channels, generally identified as 117. Each guide channel 117 is formed by a pair of elongated guide bars 118 mounted on the interior of the side frames 24. Preferably each of the guide bars 118 is made of a suitable thermoplastic bearing material.

Referring to FIG. 5 and FIG. 6., The stationary support 110 and movable support 112 carry like pairs of operating members carried in a substantially mirror image arrangement. Typically each operating member includes an elongated tubular housing 120 secured to a sliding bracket member 122. This sliding bracket member 122 is adapted to be slidably engaged on either the stationary support 110 or the movable support 112. A brace member 124 is secured at one end to its associated tubular housing 120. The other and opposite end of the brace member 124 is secured to the sliding bracket member 122. This brace member 124 is provided to reinforce the attachment of the tubular housing 120 with its associated sliding bracket 122.

An adjusting rod 126 which has a right hand male thread at one end and a left hand male thread at its other and opposite end, is carried in a clamp block 128. Typically one clamp block 128 is mounted on each of the stationary support 110 and the movable support 112. The threaded ends of the adjusting rod 126 are engaged with mating female threads provided in and through its associated brace member 124. As may be seen in FIG. 5 the adjusting rod 126 is maintained in a preferred transverse alignment with the clamp block 128 by a suitable means such as a pair of collars 130. As an Example, rotation of the adjusting rod 126 in one direction will move each of the tubular housings 120 apart. Conversely rotation of the adjusting rod 126 in an opposite direction will move the tubular housings 120 toward each other. After a proper adjustment has been made for a particular container diameter, the adjusting rod 126 is secured in the clamp block 128 to prevent any unwanted rotation.

An elongated post member 132 is reciprocally carried in each of the four tubular housings 120. The post member 132 has a through aperture 134 provided at or near its downwardly extending end. An elongated rod member 136 is inserted in each aperture 134 and extends between associated pairs of post members 132 carried on either the stationary support 110 or the movable support 112. A linear actuator 138 is provided to operate each pair of associated post members 132. Typically each of the linear actuators 138 has its piston rod 140 attached to its associated rod member 136 by a suitable means, such as a rod clevis. The body 142 of each actuator 138 is fastened to its associated stationary support 110 or movable support 112. As may be seen in FIG. 5, extension of the piston rod 140 lowers its associated pair of post members 132 while retraction of the piston rod 140 will raise the post members. 132.

A lug member, generally identified as 144, is removably mounted in a groove 146 which is selectively formed and positoned in an end of the post member 132 distal the aperture 134. A quick connect means 147 is provided for retaining each lug member 144 in the groove 146. The quick connect means 147 may be a commercially available quick connect pin carried in mating and aligned through apertures in the post 132 and the lug member 144.

Figure 9:
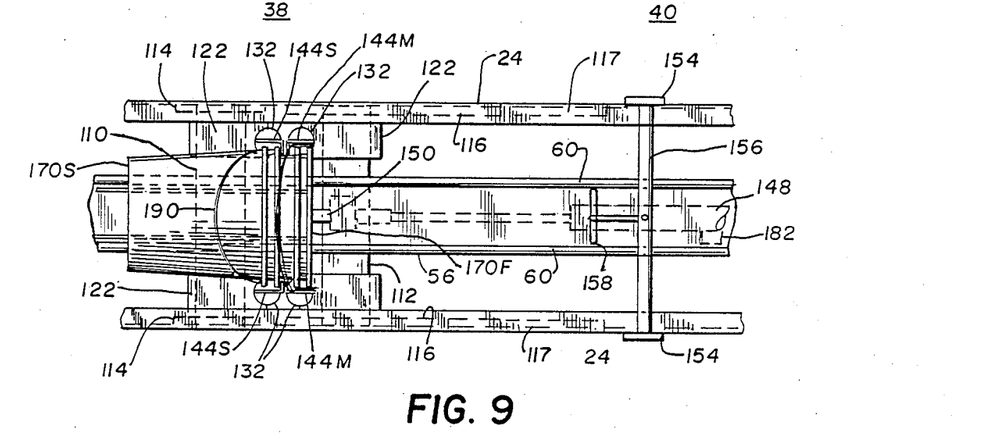
FIG. 9 represents a fragmentary top view of the separating assembly, this view in a reduced scale is taken along line 9—9 of FIG. 6.
Figure 10:
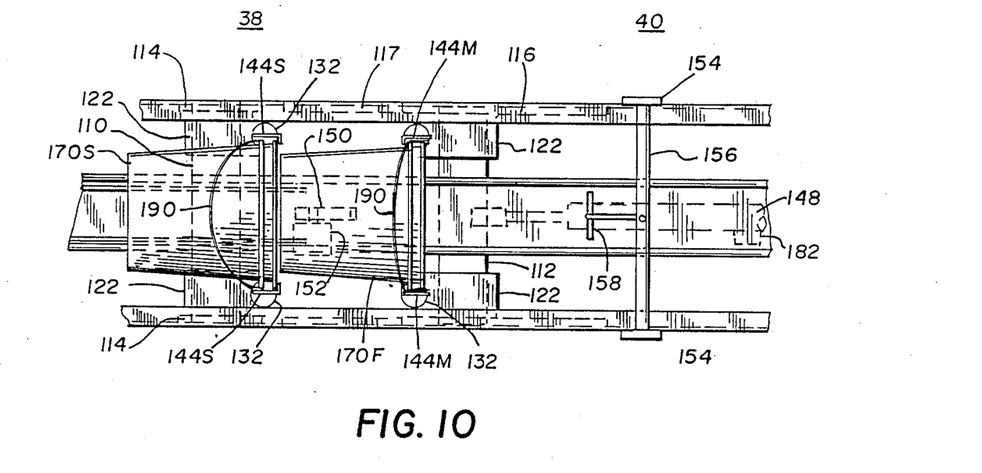
FIG. 10 represents a top view of the apparatus of FIG. 9, this view showing the action of the separating assembly during separation of a preformed container.

Controlled movement of the movable support 112 is provided by a linear actuator 148 which may be more clearly seen in FIG. 9 and FIG. 10. Selective actuation of this linear actuator 148 moves the movable support 112 with its associated operating attachments thereon. The movement of the movable support 112 is either towards or away from the stationary support 110.

Referring again to FIG. 6, A stop member 150 is rotatably mounted on a output shaft 151 of a rotary actuator 152. The rotary actuator 152 carrying the stop member 150 is mounted interior of the trough member 56 and positioned in a selected relationship with the separating assembly 38 to correctly align the front of the nested stack with the lug members 144.

Figure 7:
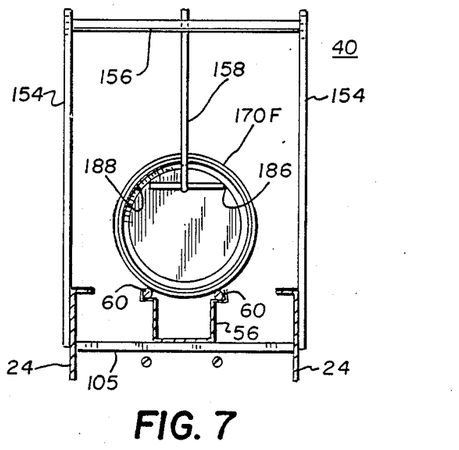
FIG. 7 represents a section view of a pivoting hook assembly, this view in enlarged scale and taken long line 7—7 of FIG. 1.

EMBODIMENT OF FIG. 7

Referring to FIG. 7, a pivoting hook assembly 40 includes a pair of mounting bars 154 mounted to and extending vertically from each side frame 24; an axle member 156 journaled in each of the mounting bars 154; and a hook member 158 adjustably mounted in and through the axle 156. This pivoting hook assembly 40 may be also seen in FIG. 1 and FIG. 2. The hook member 158 is adjusted and adapted to engage the open mouth 188 of a preformed container in horizontal array and then escape the mouth of the container after the container is tilted to a substantially vertical array. The hook 158 will then immediately return to its container engagement position, by gravity.

Figure 8:
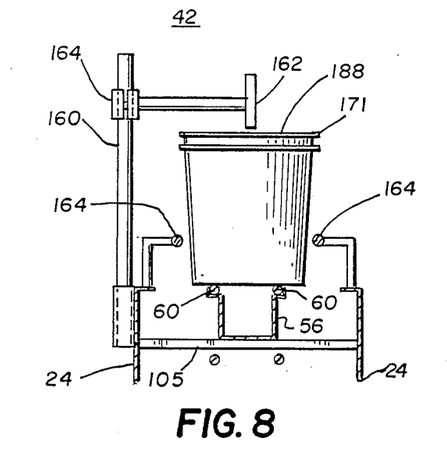
FIG. 8 represents a fragmentary side section view of a discharge end of the apparatus and showing a stabilizer assembly, this view in an enlarged scale and taken along line 8—8 of FIG. 1.

EMBODIMENT OF FIG. 8

Referring to FIG. 8, there is shown a stabilizer assembly 42. This stabilizer assembly 42 includes a vertical post 160 mounted to a side frame 24; and an elongated stabilizer bar 162 mounted on and cantilevered from the vertical post 160 by a clamp bracket 164. Clamp bracket 164 provides a means for the vertical adjustment of the stabilizer bar 162 to a preferred position at or near the top of the vertical container 171. Side guide members 164 are adjustably mounted to each of the side frames 24. These side guides 164 are preferably adjusted to guide the now vertical container 171 for easy transfer to subsequent commercially available process equipment.

USE AND OPERATION OF THE FIRST EMBODIMENT

Referring to FIG. 1, a nested stack of containers, generally identified 170, is placed on the support end 62 of the tilting carriage assembly 34. The loading of the nested stack 170 may be manually performed by machine personnel or as part of an automatic feed system, not shown. The apparatus is sequentially operated in response to a plurality of position sensing devices or interlocks.

A first interlock 172 is provided at a selected position at the extending end 64 of the tilting carriage assembly 34. This first interlock 172 verifies the presence of a sufficient quantity of containers in the nested stack 170. A second interlock 174, also shown in FIG. 3, assures that operating personnel are removed from in way of the tilting carriage assembly 34. This second interlock 174 may also be used in association with an automatic feeding device, as a position sensor. This position sensor is anticipated to verify that all feeding devices are clear of the tilting carriage 34. A third interlock 176 is selectively located along the length of the trough member 56. This third interlock 176 detects the presence of a sufficient quantity of containers in a nested stack between the separating assembly 38 and the third interlock 176.

Figure 2:
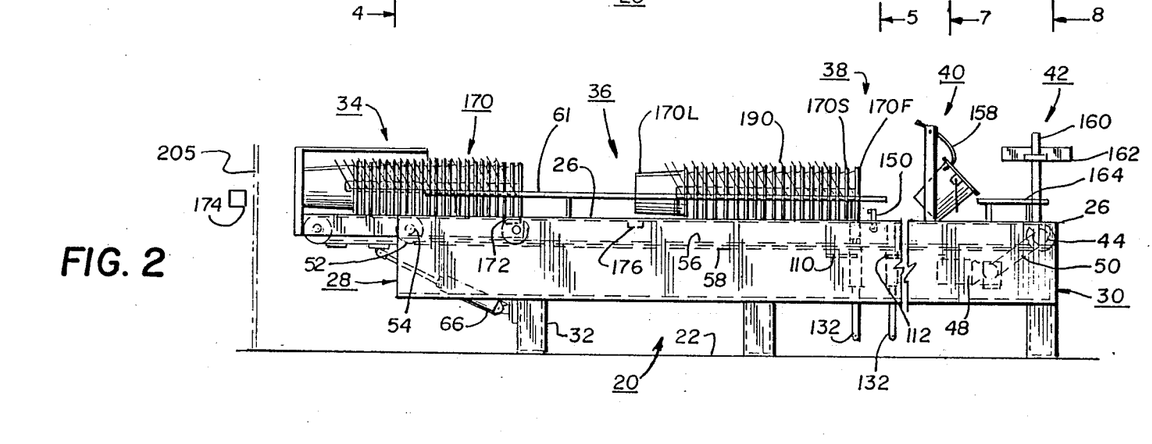
FIG. 2 represents the apparatus of FIG. 1 at a subsequent time, and particularly showing the tilting carriage assembly in a substantially horizontal array.

Referring now to FIG. 2, the tilting carriage has been rotated ninety degrees from the vertical. This rotation of the tilting carriage to a substantially horizontal position, by the actuator 66, is a result of a positive determination by the first interlock 172, second interlock 174, and the third interlock 176.

The nested stack 170 carried on the now rotated tilting carriage assembly 34 is selectively advanced toward the discharge end 30 and onto the continuously advancing long belts 58. The advancement of the nested stack 170 onto the long belts 58 is by way of short belts 94. The short belts 94 are advanced by an intermittently controlled drive means 80. This drive means 80 operates only when the tilting carriage is disposed in a horizontal array, and when the elongated rails members 70 are retracted below the long belts 58.

The first interlock 172 detects the absence of any containers on the tilting carriage assembly 34. This absent determination by the first interlock 172 along with an all clear determination by the second interlock 174 will return the tilting carriage assembly 34 to a substantially vertical array to await the loading of a next nested stack of containers by manual or automatic means.

The recently tilted nested stack 170 advancing on the long belts 58 is brought in contact with the stop member 150. Of course this recently tilted nested stack 17 will add to any containers that may be present on the long belts 58. It should be noted that it is preferred that the stop member 150 be adapted to stop and retain the first container 170F whether carried on the long belts 58 or resting on the elongated rails 98, when raised. A fourth interlock 178 is mounted to the stop member 150 to detect the contact of the stop member 150 by the first container 170F. A positive determination by the fourth interlock 178 provides a signal to raise the elongated rail assembly 96. The raised elongated rail assembly 96 lifts the nested stack 170 a sufficient amount to remove all contact of the nested stack 170 with the continuously advancing long belts 58. The lifting of the nested stack 170 from the continuously advancing belts 58 reduces excessive friction which could cause premature wear of the belt 58.

Referring now to FIG. 9 and FIG. 10, simultaneously with the lifting of the elongated rails 98 all post members 132, with lug members 144 attached, are raised in an upward direction to engage selected protruding portions of the first container 170F and second container 170S. The second container 170S is retained by a first pair of lug members 144S associated with the stationary support 110. The first container 170F is engaged by a second pair of lug members 144M associated with the movable support 112. The engagement of the second pair of lug members 144M is adapted to separate the first container 170F from the second container 170S retained by lug member 144S.

Referring now to FIG. 6, a fifth interlock 180, mounted on each linear actuator 138, detects the full extension of all post members 132. A positive determination by the fifth interlock 180 retracts the stop member 150 and provides a signal to actuator 148 to advance the movable support 112 toward the discharge end 30.

This advancement separates and accelerates the first container 170F onto the continuously advancing long belts 58. A sixth interlock 182, mounted on the linear actuator 148, detects the completion of the movement of the movable support 112 toward the discharge end 30, as shown in FIG. 10. A positive determination by the sixth interlock 182 simultaneously lowers all post members 132, raises the stop member 150, lowers the elongated rail assembly 96, and returns the movable carriage to the position shown in FIG. 9. The separating cycle will be repeated as long as there is a sufficient number of containers in the horizontal nested stack, as determined by the third interlock 176. A determination of insufficient quantity will once again activate the tilting carriage assembly 34, carrying a next nested stack thereon.

The first container 170F is carried on the top strand 60 of the long belts 58 to the pivoting hook assembly 40. The downwardly extending hook member 158 engages an interior surface 186 of the first container at a selected position at or near the mouth 188 of the container 170F, as may be seen in FIG. 7. Referring now to FIG. 1 and FIG. 2, the interaction of the pivoting hook assembly 40 with the advancing container 170F provides a tilting action. This tilting action rotates the container 17F from a substantially horizontal array to a substantially vertical array.

A stabilizer assembly 42 engages the mouth 188 of the container 170F as and when the container reaches a fully vertical array. This stabilizer assembly 42 also aids in the removal of the pivoting hook assembly 40 from the mouth 188 of the container 170F. The stabilizer assembly 42, when correctly adjusted prevents the container 170F from tilting backward to an unwanted condition.

It is to be noted that in order to separate some types of containers from the nested stack, it is necessary to lift the bale 190 or handle of the first container. Referring to FIG. 9 and FIG. 10 there is depicted the action of an angle shaped lug member 144M. This angle shaped lug member 144M will lift the bale 190 as the post member 132 is raised or extended to separate the first container from the nested stack 170. The angle shaped lug member 144M may be adapted to rotate the bale 190 substantially 180 degrees, from laying on top of the container to a more or less downward extending position.

The final disposition of the bale 190 is controllable by the shape of the lug member 144M. As one further example, a channel shaped lug member 201 as shown in FIG. 6 will restrict the rotation of the bale 190. It is anticipated that the bale 190 may be lifted a sufficient amount, by one leg of the channel, to allow separation of the first container 170F from the nested stack, then return to its original position as the channel shaped lug member 201 is retracted or lowered. It is to be noted that the second leg of the channel shaped lug member 201 may be designed to limit any excessive rotation of the bale or handle 190.

Figure 11:
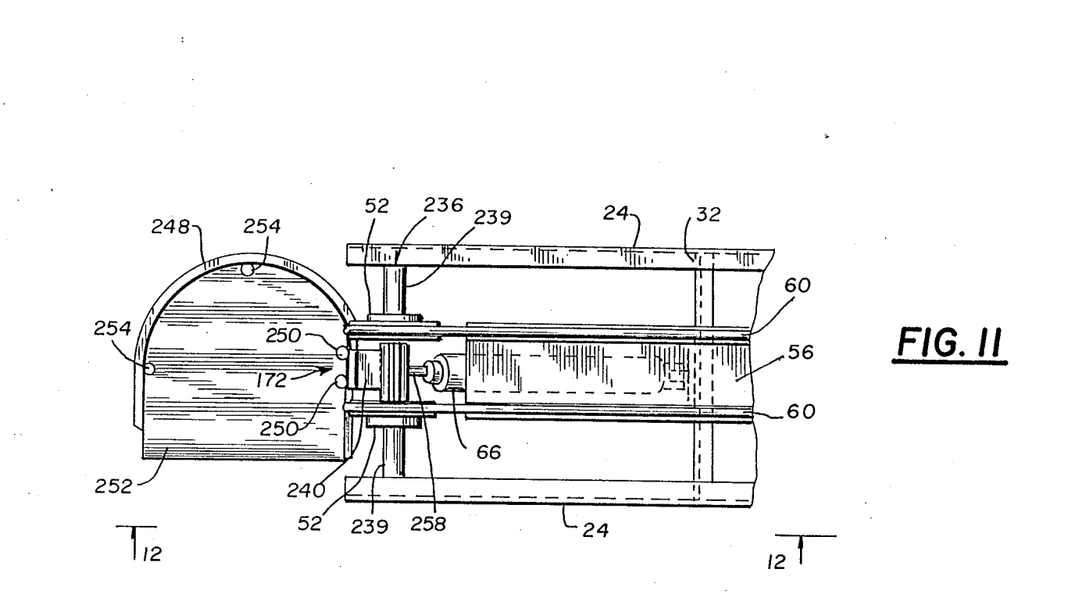
FIG. 11 represents a top view of an second embodiment for the tilting carriage assembly.
Figure 12:
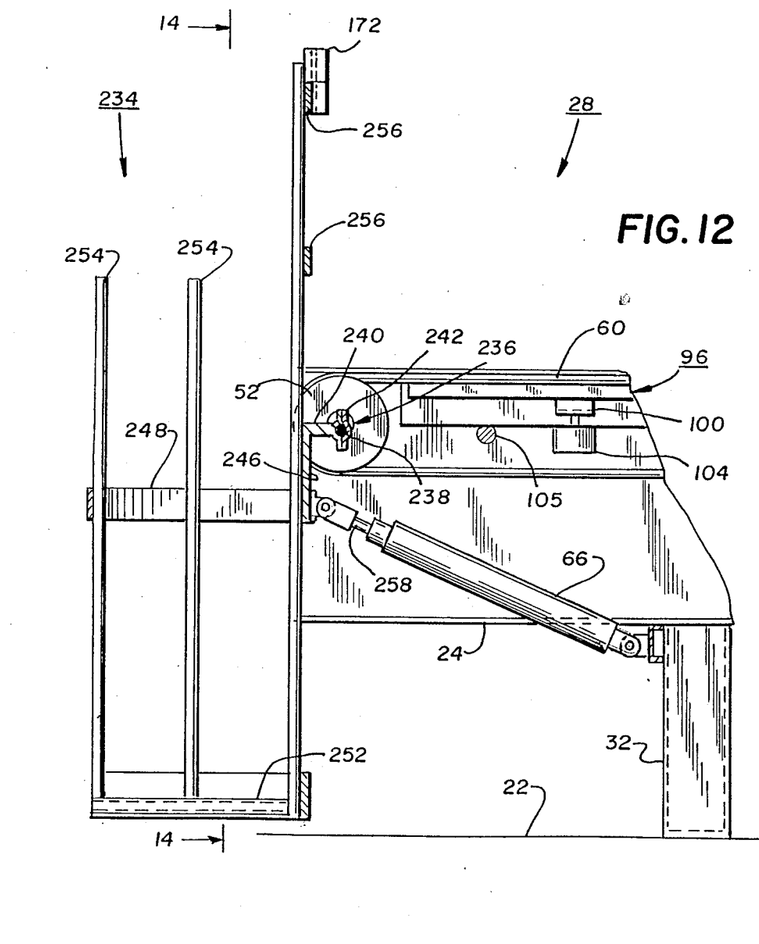
FIG. 12 represents a section view, partly diagrammatic, of the second embodiment, this view taken along line 12—12 of FIG. 11.
Figure 13:
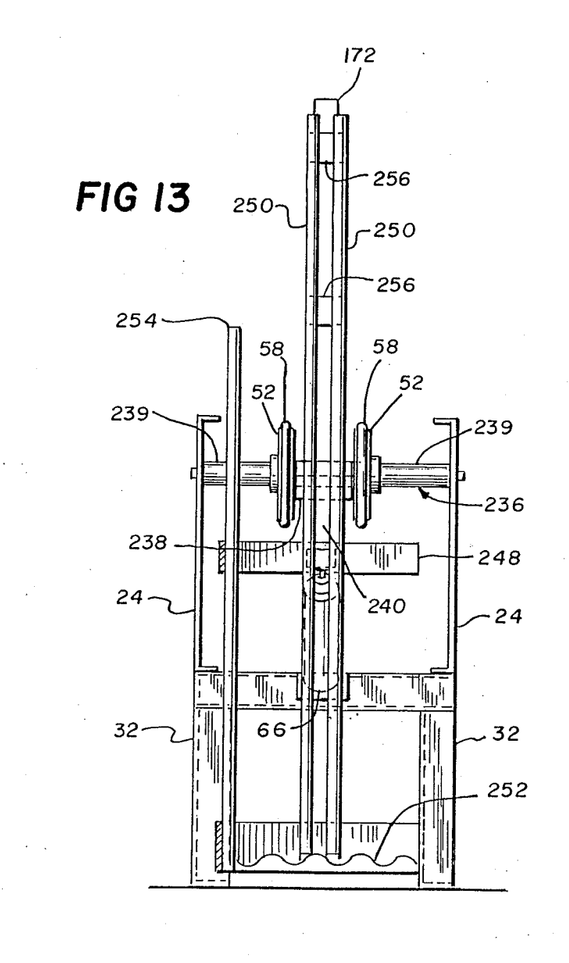
FIG. 13 represents an end elevation view of the second embodiment of a tilting carriage assembly, this view taken along line 13—13 of FIG. 12.

EMBODIMENT OF FIG. 11, FIG. 12, AND FIG. 13

Referring in particular to FIG. 12 and FIG. 13, a second embodiment of a tilting carriage assembly is shown and generally identified as 234. This tilting carriage 234 is carried on and pivots about a stationary shaft member 236. A center portion 238 of the shaft member 236 is undercut to a diameter smaller than the diameter of the outer extents 239 of the shaft member 236. The undercut portion 238 is formed with its axis eccentric to the axis of the shaft member 236. This undercut portion 238 may be more clearly seen in FIG. 14 and FIG. 15. A pivot bracket 240 has a split hub portion 242. This hub portion 242 is adapted to carry a split bushing 243, which acts as a radial type bearing on the shaft 236. The pivot bracket 240 is formed substantially in an L-shape. The extending leg 246 of the pivot bracket 240 is secured to a semi-circular band member 248. Referring now to FIG. 13, a pair of elongated rail members 250 are fastened to the semi-circular band member 248 in a selected array. A support platform 252 is secured to the downwardly extending portion of the elongated rails 250 at a selected position. A pair of guide bars 254 are attached to the support platform 252 and the semi-circular band member 248. These guide bars 254 extend upward from the band member 248 for a selected distance. The guide bars 254 act as a loosely fitting cage for ensuring that a nested stack 170, placed on the support member 252, will not topple off. A pair of spacer members 256 are attached to the extending end of the elongated rail members 250. The linear actuator 66 provides the necessary motion to rotate the tilting carriage assembly 234. The extending rod portion 258 is pivotly attached to the pivoting bracket 240. The body of the actuator 66 is pivotly mounted to the leg member 32.

USE AND OPERATION

The conditions for operating this tilting carriage assembly 34 is similar to the previously described tilting carriage assembly 34. One noticeable difference between the two embodiments is the absence of the short endless belts 94 and associated drive means.

This tilting carriage assembly 234 is rotated in response to a positive determination from the first interlock 172, second interlock 174, and third interlock 176. Each of these interlocks have been previously described.

Figure 14:
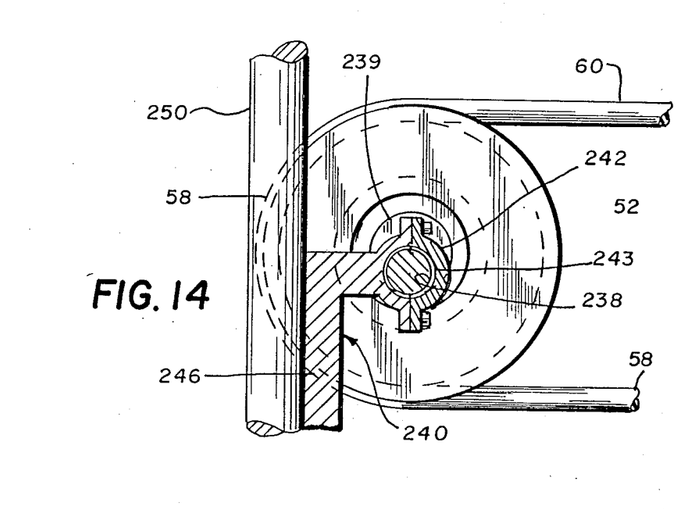
FIG. 14 represents an enlarged section view of a pivot arrangement of the second embodiment of FIG. 13.

Referring in particular to FIG. 14, it may be seen that the elongated guide rails 250 are positioned at a radial distance greater than the radius of the long belt 58 carried on the driven pulley 52. This preferred arrangement of the vertically arrayed guide rails 250 with the long belts 58 eliminates premature contact of the nested stack 170 with the continuously advancing belt 58.

Figure 15:
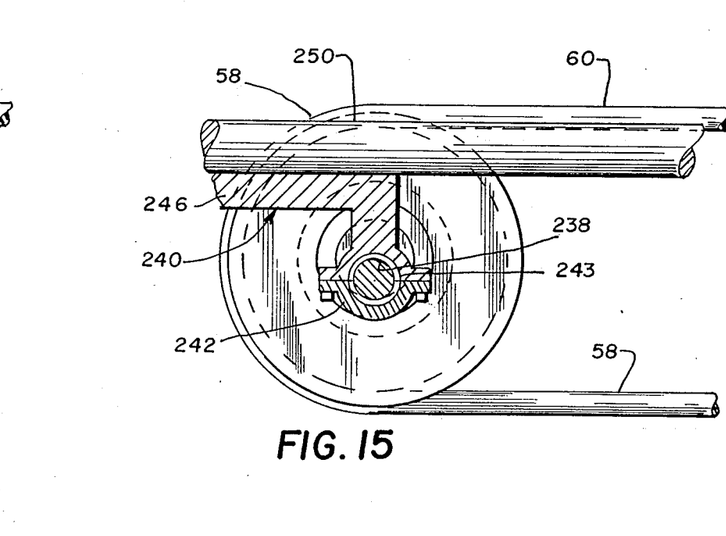
FIG. 15 represents a sectional view of the pivot arrangement of FIG. 14, this view particularly showing the relationship of components after a ninety degree rotation of the tilting carriage.

Referring to FIG. 15, it may be now seen that the radial position of the now horizontally placed elongated guide rails 250 is less than the radius of the long belts 58 carried on the driven pulley 52. The amount of distance between the top strand 60 of the endless belt 58 and the surface of the guide rail 250 is dependent on the amount of eccentricity of the undercut portion 238 with the shaft member 236.

This tilting carriage assembly 234 is particularly adapted for use with containers which tend to become locked together by their bales or handles 190. The nested stack of containers is rotated from a vertical array on demand from the third interlock 176, provided that a positive determination is made by the first interlock 172 and the second interlock 174. The nested stack 170 carried on the guide rails 250, and now in horizontal array, is preferably placed on the top strand 60 of the long belts 58. It is preferred that a slightly greater portion of the nested stack rest on the continuously advancing long belts 58. A vertically nested stack ratio of 60/40 percent (top/bottom) has been found satisfactory to advance the complete nested stack 170 from the tilting carriage 234 onto the advancing long belts 58.

This ratio is determined by the vertically stacking 60 percent of the containers above the pivot shaft 236 and 40 percent below. It is to be noted that other proportions between the range of 55/45 and 70/30 (top/bottom) are anticipated to give satisfactory results. The subsequent handling of the nested stack hereinafter is substantially the same as previously described above.

The apparatus as herein described is adapted for feeding separating and orienting metallic or non-metallic containers. This apparatus is particularly adapted for feeding and separating containers in the 2½ to 7 Gallon size. It is anticipated that individual containers will be separated and fed up to 25 per minute.

The actuators whether linear or rotary are preferred to be pneumatically operated. It is anticipated that actuators that are electro-mechanically operated may be used. The type of actuator is therefore a matter of design selection.

Reference has been made to interlocks or position sensors. It is preferred that air-logic sensors be used since this equipment may be installed in explosive environments. It is of course anticipated that other suitable interlocks such as electrical limit switches, proximity switches, photocells, pressure switches, and the like may be used.

Referring to FIG. 1, FIG. 2, and FIG. 3, it is anticipated; that a safety enclosure 205 will be provided to protect machine personnel who manually load the nested stacks 170 onto either the tilting carriage 34 or tilting carriage 234. The third interlock 176 may be operated by an access door portion of the enclosure 205.

Terms such as "left", "right", "up", "down", "bottom", "top", "front", "back", "in", "out" and the like are applicable to the embodiments shown and described in conjunction with the drawings. These terms are merely for the purpose of description and do not necessarily apply to the position in which the feeding, separating, and metering apparatus of the present invention may be employed.

While these particular embodiments of a separating, feeding, and metering apparatus have been shown and described, it is to be understood that the invention is not limited thereto and protection is sought to the broadest extent the prior art allows.

What is claimed is:

1. An improved apparatus for separating and feeding a preformed container from a nested stack of containers, said apparatus including:
   (a) an elongated base assembly adapted for resting on a floor, said base assembly including a pair of elongated side frame members held in a selected spaced relationship, each side frame member having an upper edge portion, an infeed end and a discharge end;
   (b) at least two endless long belts extending from said infeed end to said discharge end of said base assembly, each of said long belts having a top strand and a bottom strand, each long belt carried on a first drive pulley and at least one driven pulley, said first drive pulley and each of said driven pulleys being selectively positioned interior of said side frame members;
   (c) a shaped elongated trough member mounted interior of said base assembly, said trough member adapted to support said top strand of each of said long belts in a selectively spaced and substantially parallel alignment along said upper edge portion;

(d) a drive means connected to each of said first drive pulleys, said drive means adapted to selectively advance the top strand of each of said long belts from said infeed end to said discharge end;

(e) a tilting carriage assembly pivotally mounted interior of said infeed end of said base assembly, said tilting carriage assembly including a support end, an extending end, a first actuator, and a pivot means, said pivot means selectively positioned between said support end and said extending end to provide a predetermined ratio of a top portion of said nested stack to a bottom portion of said nested stack, said support end adapted to accept said stack of nested preformed containers in a substantially vertical array, said first actuator adapted for tilting said tilting carriage assembly with said nested stack thereon from said substantially vertical array to a substantially horizontal array, said pivot means adapted to provide a predetermined spacing between said endless belt radially engaged on one of said driven pulleys and said tilting carriage in a substantially vertical array, said pivot means further adapted for placing said top portion of said nested stack of containers in contact with said advancing long belts when said tilting carriage is brought to said horizontal array, said contact of said top portion of said nested stack with said advancing long belts advancing all of said nested stack toward said discharge end;

(f) a stop member retractibly mounted interior of said trough member, said stop member selectively raised to stop said nested stack advancing on said long belts;

(g) an elongated rail assembly mounted interior of said trough member, said rail assembly extending a selected length from said stop member toward said infeed end;

(h) an actuating means for said elongated rail assembly, said actuating means adapted to selectively move said rail assembly from a retracted position to an up position, said up position for lifting said nested stack off the advancing long belts, said retracted position adapted for allowing said nested stack to be carried and advanced on said long belts;

(i) a container separating assembly mounted to and on said base assembly, said container separating assembly selectively positioned relative to said stop member, said container separating assembly adapted for separating a first container of said nested stack from said nested stack lifted by said elongated rail assembly, said separating assembly further adapted to selectively advance said first container from said elongated rail assembly onto said advancing long belts;

(j) a pivoting hook assembly mounted to said base assembly, said pivoting hook assembly selectively located between said container separating assembly and said discharge end, said pivoting hook assembly adapted for engaging the open mouth of said first container advancing on said long belts, said pivoting hook assembly further adapted for tilting said first container advancing on said long belts from a substantially horizontal array to a substantially vertical array; and (k) a stabilizer means mounted to said base assembly at said discharge end, said stabilizer means adapted for contacting the mouth of said first container disengaging from said pivoting hook assembly in a substantially vertical array, said stabilizer means maintaining said vertical array of said first container as said first container exits said apparatus.

2. An apparatus as recited in claim 1 wherein said pivot means of the tilting carriage assembly includes:

(a) a stationary shaft member adapted for mounting interior of said base assembly at said infeed end, said stationary shaft member having a reduced diameter undercut portion, said undercut portion formed eccentric to the axis of said stationary shaft member and at a selected position, said shaft adapted to rotatably carry one of said driven pulleys on an enlarged diameter portion of said shaft, said enlarged portion adjacent each end of said undercut portion; and (b) A pivot bracket having a hub portion and an extending leg portion, said hub portion adapted for rotatable mounting on said undercut portion, said extending leg portion adapted for mounting to said tilting carriage, said pivot bracket cooperating with said undercut portion to provide said predetermined spacing between said endless belt and said vertical tilting carriage and then also subsequently provide said contact of said top portion of said nested stack with said endless belts when the tilting carriage is brought to said horizontal array.

3. An apparatus as recited in claim 2 wherein said hub portion of said pivot bracket is split, said split hub portion adapted for assembly of the pivot bracket on said undercut portion of the stationary shaft.

4. An apparatus as recited in claim 2 wherein said trough member further includes:

(a) a pair of leg members;
(b) a horizontally disposed bottom side member, each of said leg members extending upwardly from said bottom side member, said leg members and said bottom side member forming a substantially U-shaped array; and
(c) a continuous V-shaped channel formed along an edge of each leg member, said edge of the leg member distal said bottom side member, said V-shaped channel adapted to guide and support said top strand of said long belt.

5. An apparatus as recited in claim 4 wherein said stop member is engaged on the output shaft of a rotary actuator, said rotary actuator adapted for selectively raising or retracting said stop member.

6. An apparatus as recited in claim 5 wherein said stop member is adapted to stop said nested stack carried on said long belts and then retain said nested stack when raised on said elongated rail assembly.

7. An apparatus as recited in claim 5 wherein the container separating assembly further includes:

(a) a stationary support member adapted for mounting interior of said base assembly at a selected position,
(b) a movable support member adapted to be slidably carried interior of the base assembly, said movable member further adapted for horizontal and reciprocal movement with respect to the stationary support member,
(c) a plurality of operating means, each operating means including:
(1c) a sliding bracket member adapted for sliding engagement on either said stationary support member or said movable support member;
(2c) an elongated tubular housing adapted for mounting to said sliding bracket member in a selected array, said tubular housing having its through aperture in a substantially vertical array, (3c) an elongated post member adapted for reciprocal movement in said through aperture of said tubular housing, said post member adapted to removably retain and carry a lug member, said lug member adapted to engage selected portions of the containers of said nested stack, a first pair of said operating means slidably engaged on said stationary support in a selectively spaced array, a second pair of said operating means slidably engaged on said movable support member in a selectively spaced array, (d) a second linear actuator adapted for mounting on said stationary support member, said second linear actuator adapted for selectively and simultaneously raising or lowering said post members of said first pair of operating means, (e) a third linear actuator adapted for mounting to and on said movable support member, said third linear actuator adapted for selectively and simultaneously raising or lowering the post members of said second pair of operating means, (f) a first adjusting means and a second adjusting means, said first adjusting means adapted for retentively positioning said first pair of operating means for proper alignment of said lug member with the preformed containers, said second adjusting means adapted for retentive positioning of said second pair of operating means for proper alignment of said lug member with said first container; and (g) a fourth linear actuator adapted for selectively moving said movable support away from or towards said stationary support member.

8. An apparatus as recited in claim 7 wherein said pivoting hook assembly further includes:

(a) a pair of mounting bars adapted for mounting to said base assembly, said mounting bars disposed in a substantially vertical array;

(b) an axle member adapted for journaled mounting in and on said pair of mounting bars, said axle member selectively positioned over and above said long belts; and (c) a hook member having an attachment end and a shaped free end, said attachment end adapted for adjustably mounting said hook member in and on said axle member, said shaped free end adapted for engaging the open mouth of said first container.

9. An apparatus as recited in claim 8 wherein said stabilizer assembly includes:

(a) a vertical post member adapted for attaching to one of the side frame members at as selected position;

(b) a clamp bracket adapted for adjustable and retentive engagement on said vertical post member; and (c) an elongated stabilizer bar adapted for mounting to said clamp bracket in a cantilevered array, said clamp bar with said elongated stabilizer bar mounted thereon adjustable to a predetermined position for passage of a container thereunder.

10. An apparatus as recited in claim 7 wherein each of said lug members carried on said second pair of operating means is adapted to rotate a handle of said first container a predetermined amount when said post members are raised, said rotation of said handle providing for the disengagement of said handle from said nested stack and allowing said separation of the first preformed container.

11. An improved apparatus for separating and feeding a preformed container from a nested stack of containers, said apparatus including:

(a) an elongated base assembly adapted for resting on a floor, said base assembly including a pair of elongated side frame members held in selected spaced relationship, said side frame members having an upper edge portion, an infeed end and a discharge end;

(b) at least two endless long belts extending from said infeed end to said discharge end of said base assembly, each of said long belts having a top strand and a bottom strand, each long belt being carried on a first drive pulley and at least one driven pulley, said first drive pulley and each of said driven pulleys being selectively positioned interior of said side frame members;

(c) a shaped elongated trough member mounted interior of said base assembly, said trough member adapted to support said top strand of each of said long belts in selectively spaced and substantially parallel alignment along said upper edge portion;

(d) a drive means connected to each of said first drive pulleys, said drive means adapted to selectively advance the top strand of each of said long belts from said infeed end to said discharge end;

(e) a tilting conveyor assembly pivotally mounted interior of said infeed end of said base assembly, said tilting conveyor assembly having a support end, an extending end, a first actuator, and a pivot means, said pivot means selectively positioned between said support end and said extending end to provide a predetermined alignment of said support end with said floor, said support end adapted to accept said stack of nested preformed containers in a substantially vertical array, said first actuator adapted for tilting said tilting conveyor assembly with said nested stack thereon from said substantially vertical array to a substantially horizontal array;

(f) at least two endless short belts extending from said support end to said extending end, each of said short belts are carried on a second drive pulley and a cantilevered driven pulley, each of said drive pulleys mounted at the support end, each of said cantilevered driven pulleys mounted at the extending end, said short belts arrayed in spaced relationship for supporting said nested stack when tilted to a substantially horizontal array;

(g) an intermittent drive means carried on said tilting conveyor assembly, said intermittent drive means adapted to selectively advance said short belts, said intermittently driven short belts adapted for advancing said nested stack in substantial horizontal array onto said long belts;

(h) a stop member retractibly mounted interior of said trough member, said stop member selectively raised to stop said nested stack advancing on said long belts when desired;

(i) an elongated rail assembly mounted interior of said trough member, said rail assembly extending a selected length from said stop member toward said infeed end;

(j) an actuating means for said elongated rail assembly, said actuating means adapted to selectively move said rail assembly from a retracted position to an up position, said up position for lifting said nested stack off the advancing long belts, said retracted position adapted for allowing said nested stack to be carried and advanced on said long belts;

(k) a container separating assembly mounted to said base assembly, said container separating assembly selectively positioned relative to said stop member; said container separating assembly adapted for separating a first container of said nested stack from said nested stack, said separating assembly further adapted to advance said first container from said elongated rail assembly and onto said advancing long belts;

(l) a pivoting hook assembly mounted to said base assembly, said pivoting hook assembly selectively located between said container separating assembly and said discharge end, said pivoting hook assembly adapted for engaging the open mouth of said first container advancing on said long belts, said pivoting hook assembly further adapted for tilting said first container advancing on said long belts from a substantially horizontal array to a substantially vertical array; and (m) a stabilizer means mounted to said base assembly at said discharge end, said stabilizer means adapted for contacting the mouth of said first container disengaging from said pivoting hook assembly in a substantially vertical array, said stabilizer means maintaining said vertical array of said first container as said first container exits said apparatus.

12. An apparatus as recited in claim 11 wherein said trough member further includes:
(a) a pair of leg members;
(b) a horizontally disposed bottom side member, each of said leg members extending upwardly from said bottom side member, said leg members and said bottom side member forming a substantially U-shaped array; and
(c) a continuous V-shaped channel formed along an edge of each leg member, said edge of the leg member distal said bottom side member, said V-shaped channel adapted to guide and support said top strand of said long belt.

13. An apparatus as recited in claim 12 wherein said stop member is engaged on the output shaft of a rotary actuator, said rotary actuator adapted for selectively raising or retracting said stop member.

14. An apparatus as recited in claim 13 wherein said stop member is adapted to stop said nested stack carried on said long belts then retain said nested stack when raised on said elongated rail assembly.

15. An apparatus as recited in claim 14 wherein the container separating assembly further includes:
(a) a stationary support member adapted for mounting interior of said base assembly at a selected position,
(b) a movable support member adapted to be slidably carried interior of the base assembly, said movable member further adapted for horizontal and reciprocal movement with respect to the stationary support member,
(c) a plurality of operating means, each operating means including:
(1c) a sliding bracket member adapted for sliding engagement on either said stationary support member or said movable support member;
(2c) an elongated tubular housing adapted for mounting to said sliding bracket member in a selected array, said tubular housing having its through aperture in a substantially vertical array,
(3c) an elongated post member adapted for reciprocal movement in said trough aperture of said tubular housing, said post member adapted to removably retain and carry a lug member, said lug member adapted to engage selected containers of said nested stack,
a first pair of said operating means slidably mounted on said stationary support in a selected array, a second pair of said operating means slidably engaged on said movable support member in a selected array,
(d) a second linear actuator adapted for mounting on said stationary support member, said second linear actuator adapted for selectively and simultaneously raising or lowering said post members of said first pair of operating means,
(e) a third linear actuator adapted for mounting to and on said movable support member, said third linear actuator adapted for selectively and simultaneously raising or lowering the post members of said second pair of operating means,
(f) a first adjusting means and a second adjusting means, said first adjusting means adapted for retentively positioning said first pair of operating means for proper alignment with a preformed container, said second adjusting means adapted for retentive positioning of said second pair of operating means for proper alignment with said first container; and
(g) a fourth linear actuator adapted for selectively moving said movable support away from or towards said stationary support member.

16. An apparatus as recited in claim 15 wherein said pivoting hook assembly further includes:
(a) a pair of mounting bars adapted for mounting to said base assembly, said mounting bars disposed in a substantially vertical array;
(b) an axle member adapted for journaled mounting in and on said pair of mounting bars, said axle member selectively positioned over and above said long belts; and
(c) a hook member having an attachment end and a shaped free end, said attachment end adapted for adjustably mounting said hook member in and on said axle member, said shaped free end adapted for engaging the open mouth of said first container.

17. An apparatus as recited in claim 16 wherein said stabilizer assembly includes:
(a) a vertical post member adapted for attaching to one of the side frame members at as selected position;
(b) a clamp bracket adapted for adjustable and retentive engagement on said vertical post member; and
(c) an elongated stabilizer bar adapted for mounting to said clamp bracket in a cantilevered array, said clamp bar with said elongated stabilizer bar mounted thereon adjustable to a predetermined position for passage of a container thereunder.

18. An apparatus as recited in claim 15 wherein each lug member of said second pair of operating means is adapted to rotate a handle of said first container a predetermined amount when said post members are raised, said rotation of said handle adapted to disengage said handle of said first container from said nested stack and allowing said separation of said first container.

* * * * *